United States Patent
Mitchell

(10) Patent No.: US 6,216,261 B1
(45) Date of Patent: *Apr. 10, 2001

(54) METHOD AND APPARATUS FOR GENERATING GENERIC PROGRAMMING INSTRUCTIONS USING VISUAL PROGRAMMING

(75) Inventor: Jason Loren Mitchell, Brookline, MA (US)

(73) Assignee: ATI Technologies Inc., Thornhill (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,067

(22) Filed: Aug. 27, 1998

(51) Int. Cl.[7] .................................................. G06F 9/45
(52) U.S. Cl. ........................................ 717/1; 717/2
(58) Field of Search .............................. 395/701; 717/1, 717/2

(56) References Cited

U.S. PATENT DOCUMENTS

| | | | |
|---|---|---|---|
| 5,428,740 | * | 6/1995 | Wood et al. ............... 717/1 |
| 5,485,600 | * | 1/1996 | Joseph et al. ............ 703/13 |
| 5,485,615 | * | 1/1996 | Wennmyr .................. 717/2 |
| 5,754,858 | * | 5/1998 | Broman et al. .............. 717/1 |
| 5,815,711 | * | 9/1998 | Sakamoto et al. ......... 717/1 |
| 5,883,639 | * | 9/1998 | Walton et al. ............. 345/473 |
| 5,911,070 | * | 6/1999 | Solton et al. .............. 717/1 |
| 5,960,410 | * | 9/1999 | Halpern ..................... 705/21 |

* cited by examiner

Primary Examiner—Mark R. Powell
Assistant Examiner—Hoang-Vu Antony Nguyen-Ba
(74) Attorney, Agent, or Firm—Markison & Reckamp, P.C.

(57) ABSTRACT

A method and apparatus for generating generic programming instructions using visual programming begins by providing a plurality of logical states that are interdependently related and include a set of programming options. When a programming option is selected, out of the set of programming options, for one of the plurality of logical states, the selected programming option is detected by a processing module. These programming options allow a user to change the characteristics of an image such as its color or brightness. Additionally, generic programming instructions corresponding to the selected programming option are provided to the user. The generic programming instructions are source code that is generated when a programming option is selected. With such a method and apparatus, generic programming instructions can be generated using visual programming that provides a set number of linked programming language blocks for use in video graphics processing.

19 Claims, 3 Drawing Sheets

METHOD AND APPARATUS FOR GENERATING GENERIC PROGRAMMING INSTRUCTIONS USING VISUAL PROGRAMMING

TECHNICAL FIELD OF THE INVENTION

This invention relates generally to programming and more particularly to visual programming to produce generic programming instructions for video graphics applications.

BACKGROUND OF THE INVENTION

Computing devices, such as those used in personal computers, laptops, video games, etc., include a central processing unit, system memory, video graphics processing circuitry, audio processing circuitry, and peripheral ports. The peripheral ports allow the central processing unit to access peripheral devices such as monitors, printers, external tape drives, video sources, etc., which facilitate the execution of computing applications. Such computing applications include word processing applications, drawing applications, painting applications, spreadsheet applications, video games, broadcast television signals, cable television signals, etc. For example, as a central processing unit processes an application, it provides image data to the video graphics processing circuitry, which, in turn, processes the image data and provides the processed image data to a display device. The display device may be a computer monitor, a television, a LCD panel and/or any other device that displays pixel information.

Typically, the central processing unit processes software to generate geometric data regarding the images to be rendered and provides the geometric data to the video graphics circuit. The video graphics circuit, upon receiving the geometric data, processes it to generate pixel data of the image. As the video graphics circuit is generating the pixel data, it stores the pixel data in a frame buffer. When the video graphics circuit has processed a full frame of geometric data, the frame buffer is full and provides the pixel data to the display device. Typically, the video graphics circuit includes a culling module, a set-up module, and a raster module.

Computing devices may include various types of processing devices that interface with the video graphics circuit, which often require customized programming. The customized programming allows for a customized output of images, and/or predictable outputs from different types of processing devices. As such, the video graphics circuit, regardless of the processing device it's coupled to, will provide a predictable customized image output to the display monitor. This customized programming is typically hard coded and usually does not allow any user interaction to alter the output of images by changing the customized code.

To give the user more control in determining and providing a customized output of images, video editing has been developed. Video editing allows a user to generate object code by choosing particular options from menus that correspond to a set of code. Based on the options that are selected, the associated object code is implemented, and the image is altered in some manner. For example, the object code can make the image lighter or darker. Once the user is satisfied with the resulting image, the corresponding object code will be provided to the video graphics circuit.

Another programming technique that is used to generate object code is visual programming. Such visual programming requires its users to select specific programming language blocks to generate an application. The user then creates links between the selected programming language blocks to provide a particular and continuous flow of the application. The user may also choose from differing amounts of programming language blocks based on the application, which provided inconsistencies and unnecessary confusion. Additionally, the programming language blocks were not specifically designed for use in video graphics processing thereby creating a large learning curve for the user.

Therefore, a need exists for a method and apparatus for generating generic programming instructions using visual programming that provides a set number of linked programming language blocks for use in video graphics processing.

DETAILED DESCRIPTION OF A PREFERRED EMBODIMENT

Generally, the present invention provides a method and apparatus for generating generic programming instructions using visual programming. Such processing begins by providing a plurality of logical states that are interdependently related and each includes a set of programming options. When a programming option is selected from the set of programming options for one of the plurality of logical states, a processing module detects the selected programming option. Note that each programming option corresponds to a different imaging characteristic. The processing module generates generic programming instructions based on the selected programming option. The generic programming instructions may be source code that is presented to the user as the programming options are selected. With such a method and apparatus, generic programming instructions can be generated using visual programming that provides a set number of linked programming language blocks. The resulting generic programming instructions can then be compiled into object code by various computing devices without having to independently generate object code for the computing devices.

Figure 1:
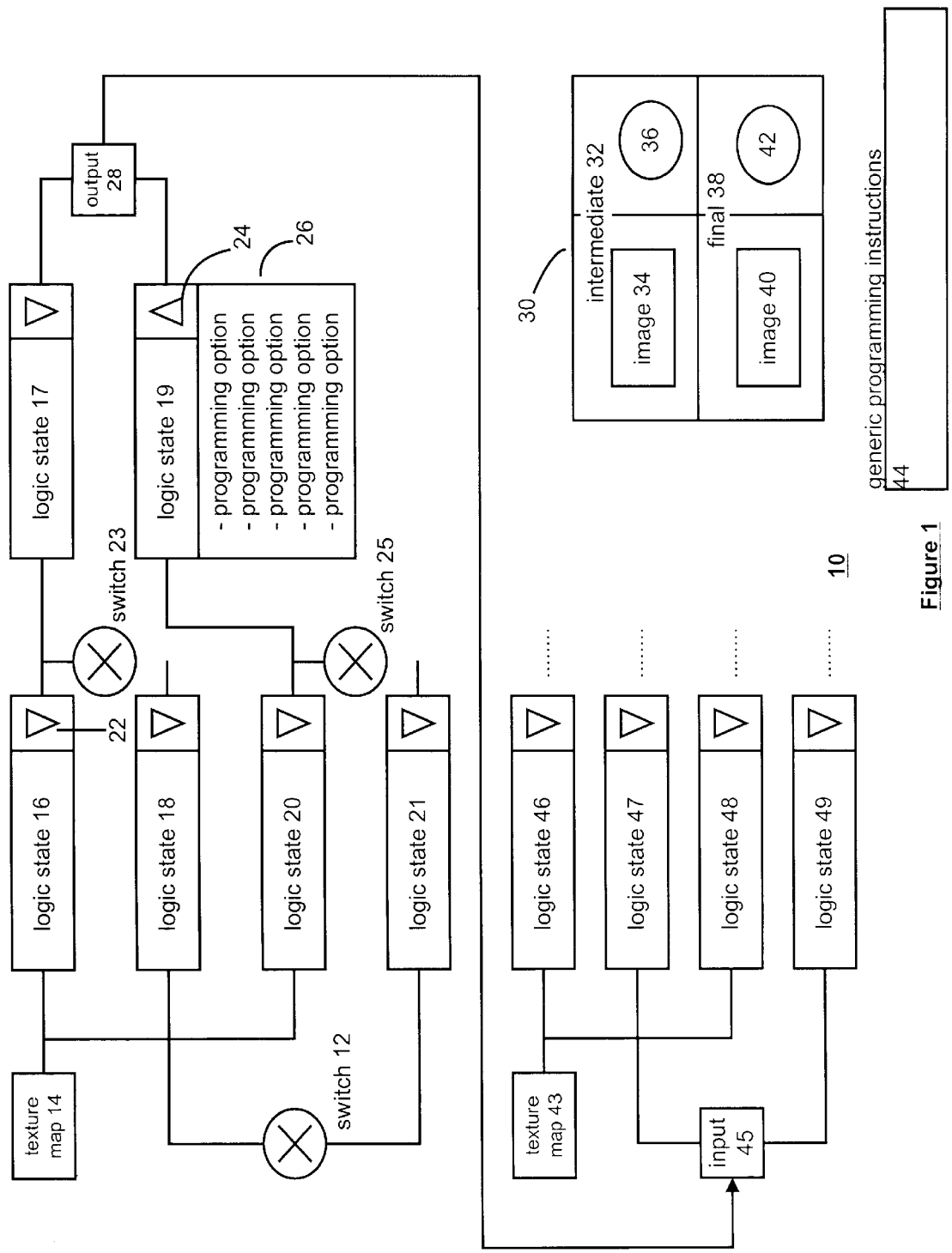
FIG. 1 illustrates a graphical representation of a visual programming process in accordance with the present invention.

The present invention can be more fully described with reference to FIGS. 1 through 3. FIG. 1 illustrates a graphical representation of the visual programming process 10 that includes switches 12, 23 and 25, texture maps 14 and 43, logic states 16–21 and 46–49, menu bars 22 and 24, programming options 26, output 28, input 45, visual representation of generic programming instructions window 30, and a generic programming instructions window 44. The graphical representation of the visual programming process 10 is displayed on a display device (not shown) of a computing device. A user, through the computing device, can interact with the graphical representation of the visual programming process 10.

Switch 12 provides texture parameters to logic states 18 and 21. Such texture parameters may include a pattern, bump map information, materials (e.g., plastic, gold, silver, wood, etc.), color, and/or any other information that may be represented in a texture mapping process. Texture map 14 also provides texture parameters to logic states 16 and 20. The texture parameters and the texture map 14, which contains a particular image, may be stored in system memory of a computing device, may be stored in local memory associated with a video graphics processor, or in any combination thereof. The texture parameters are used to render the image in texture map 14 on a display device.

Every logic state is interdependently related and has a menu bar such as menu bar 22 of logic state 16. When menu bar 24 of logic state 19 is engaged, a list of programming options 26 is presented to the user. Such programming options may be brightness, alpha blending, bump mapping processing, luminance, and other video display options. For the remainder of this discussion, brightness is representative of the function of a logic state, but could be any other function or combination of functions listed above. The user can choose at least one programming option per logical state. Based on the chosen programming option, the color and/or brightness of the texture parameters and/or the texture map 14 is changed.

Switch 23 allows the user to choose programming options from either logic state 16 or logic state 18 while switch 25 allows the user to choose programming options from either logic state 20 or logic state 21. Logic states 16 and 20 are respectively associated with changes made to texture map's 14 color and brightness while logic states 18 and 21 are respectively associated with changes made to the texture parameters color fragment and brightness fragment. The color fragment of logic state 18 and brightness fragment of logic state 21 respectively contain the inverse color and brightness of logic states 16 and 20. In addition to the color and brightness programming options available to the user, a null programming option can be selected for a particular logic state. In this situation, no changes from that logic state will be considered.

In FIG. 1, as an example, the user has made data (color, brightness) changes to logic states 16 and 20. The output of logic state 16 is sent to logic state 17 while the output of logic state 20 is sent to logic state 19. Logic states 17 and 19 respectively process this data and the data to output 28. Output 28 then sends the data to input 45 associated with texture map 43 of a partially shown group of logic states 46–49. Texture map 43 contains a different texture map or a different imaging affect as that of texture map 14. The full group and functionality of logic states, switches, links, and programming options associated with texture map 43, are similar to those discussed in regard to texture map 14. A number of new texture maps can be added and to do so, the output of the previous texture map's logic states would be sent to the input of the new texture map's logic states. As an example, texture map 43 may be the effect of a concave mirror and texture map 14 may contain the effect of a brick wall. In this scenario, the color and/or brightness of the brick wall can be modified before it is imposed on the concave mirror. Additionally, the color and/or brightness of the concave mirror and/or the color and/or brightness of the brick wall once imposed on the concave mirror can also be changed based on the users' selections.

Each logic state functions to generate a line or lines of source code and the plurality of logic states function as a state machine to provide generic visual programming instructions for use in video graphics processing. While the number of new texture maps can continue to be added, the number of logic states per texture map remains constant, but may vary from section to section. Additionally, every logic state is linked together in a particular manner to eliminate the burden put on the user to create the links and link the logic states together.

As the user chooses a programming option for each logical state, the results of those options are reflected in the visual representation of generic programming instructions window 30. The chosen programming options cause changes in color and brightness and are immediately reflected in the image 34 of texture map 14 and the grey scale window 36 of intermediate processing step 32. The changes in color and brightness are also immediately reflected in the image 40 of the texture map 14 and the grey scale window 42 of the alpha value in final processing step 38.

After a user has chosen a programming option for each logical state related to every texture map that will be processed, the color and brightness are reflected in the image 40 of the texture map 14 and the grey scale window 42 of final processing step 38. However, the user may then decide to change the color and/or brightness of image 40. For example, the user could go back to logic state 16 and choose a different programming option that represents a different color than initially chosen. This change would be updated in image 34 (e.g., the brick wall) and grey scale window 36. If the user liked the change, image 40 (e.g., the brick wall imposed on a concave mirror) is updated to show a brick wall with the new color imposed on the concave mirror. If, however, the user does not like the new changes in image 34, the user can revert to his or her previous selection(s).

As the user chooses the various programming options, generic programming instructions (not shown) corresponding to the selected programming options are provided in the generic programming instructions window 44,which cause the images 34 and 40 to be altered and updated. Note that images 34 and 40 can be altered and updated based on commands received from the outputs of the logic states, the generic programming options, and/or a combination thereof The generic programming instructions are lines of source code that may be used to create a state machine. The generic programming instructions that are generated, through the use of visual programming, reflect the user's choices for color and brightness levels of various texture maps. Since the visual programming process 10 was designed specifically for video graphics processing, the generic programming instructions, which are transportable, can be used for video graphics processing by personal computer (PC) makers, video game makers, etc. Thus, the user is not faced with a large leaning curve to design video graphics applications.

Figure 2:
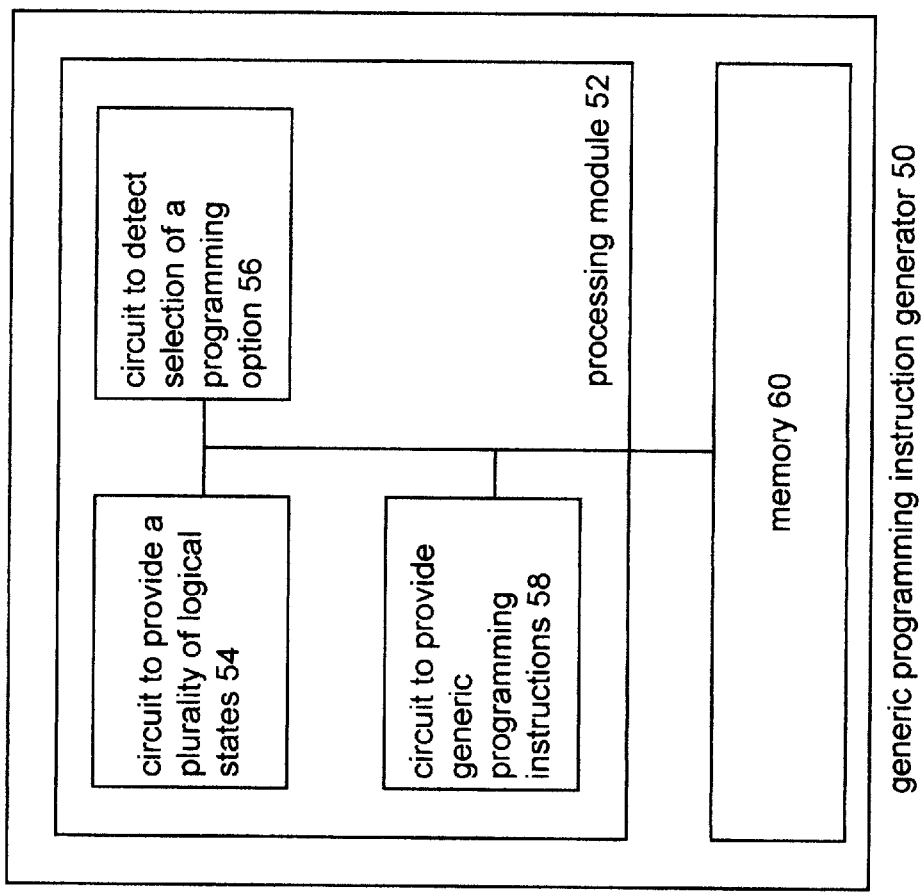
FIG. 2 illustrates a schematic block diagram of a generic programming instruction generator in accordance with the present invention.

FIG. 2 illustrates a schematic block diagram of a generic programming instruction generator 50 that includes a processing module 52 and memory 60. The processing module 52 may be microprocessor, microcontroller, digital signal processor, microcomputer, central processing unit, and/or any device that manipulates digital information based on programming instructions. The memory 60 may be read-only memory, random access memory, hard disk memory, magnetic tape memory, and/or any device that stores digital information.

The memory 60 stores programming instructions that, when read by the processing module 52, cause the processing module to function as a plurality of circuits 54–58. While reading the programming instructions, the processing module 52 functions as circuit 54 to provide a plurality of logical states, wherein each of the plurality of logical states includes a set of programming options, and wherein the plurality of logical states is interdependently related. The processing module 52 then functions as circuit 56 to detect selection of a programming option of the set of programming options for one of the plurality of logical states to produce a selected programming option. The processing module 52 then functions as circuit 58 to provide generic programming instructions corresponding to the selected programming option. The programming instructions stored in memory 60 and the execution thereof by processing module 52 will be discussed in greater detail with reference to FIG. 3.

Figure 3:
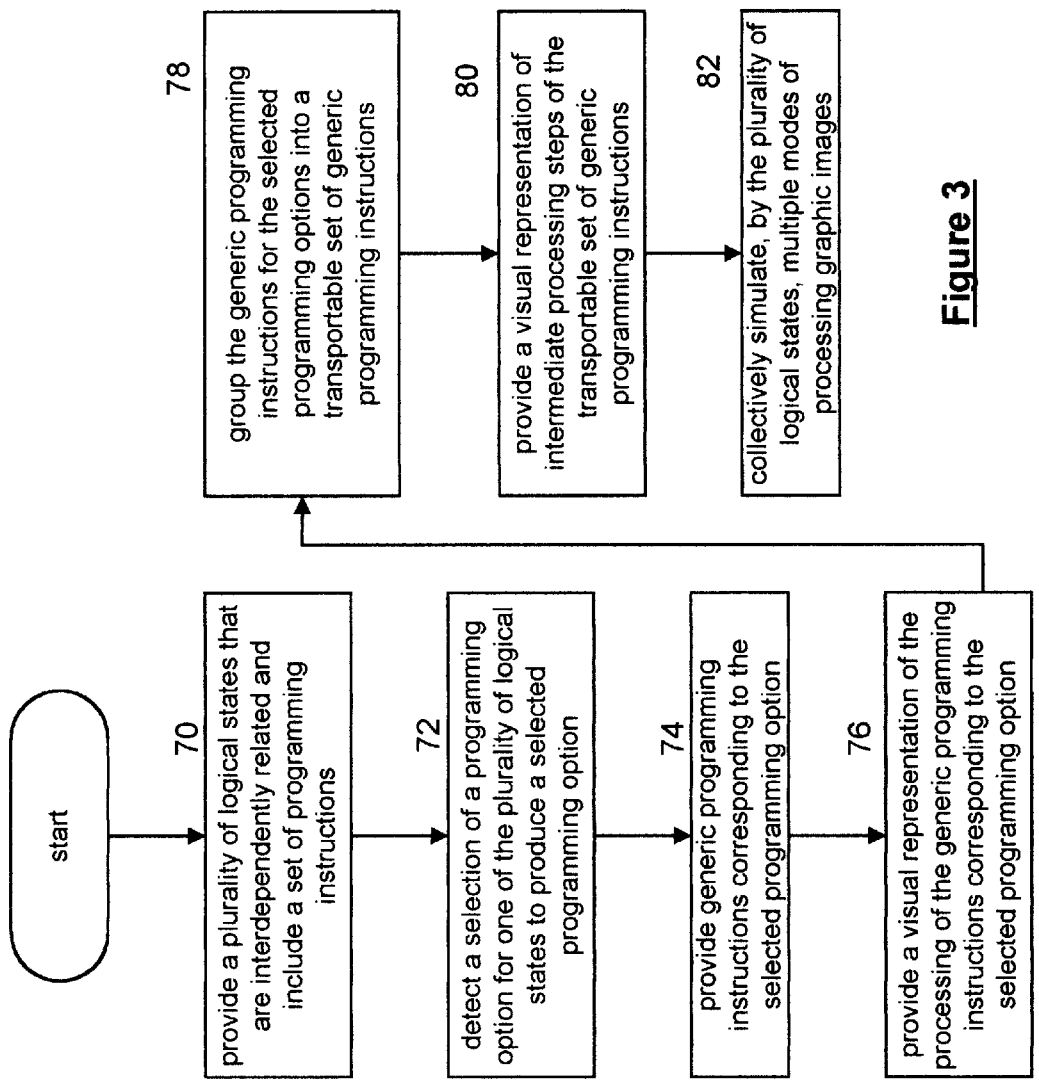
FIG. 3 illustrates a logic diagram of a method for generating generic programming instructions utilizing visual programming in accordance with the present invention.

FIG. 3 illustrates a logic diagram of a method for generating generic programming instructions utilizing visual programming. The process begins at step 70 where a plurality of logical states is provided that are interdependently related and include a set of programming instructions. At step 72, a selection of programming options is detected for one of the plurality of logical states to produce a selected programming option. At step 74, generic programming instructions are provided that correspond to the selected programming option. At step 76, a visual representation of the processing of the generic programming instructions that correspond to the selected programming option are provided. At step 78, the generic programming instructions for the selected programming options are grouped into a transportable set of generic programming instructions. At step 80, a visual representation of intermediate processing steps of the transportable set of generic programming instructions is provided. Finally, at step 82, the multiple modes of processing graphic images is collectively simulated by the plurality of logical states.

The preceding discussion has presented a method and apparatus for generating generic programming instructions using visual programming that provides a set number of linked programming language blocks for use in video graphics processing. It should be understood that other embodiments in accordance with the present invention could be used. For example, parameters such as the size or shape of an image can be used as programming options to give the user the ability to make further changes to the image. As one of average skill in the art would appreciate, the present invention is also applicable to a wide variety of visual programming environments and should not be limited to just the video graphics arena. As such, other embodiments may be developed in accordance based on the teachings of the present invention.

What is claimed is:

1. A method for generating generic programming instructions for video graphics applications, the method comprising the steps of:
   providing a plurality of texture maps;
   providing a plurality of logical states associated with each texture map, wherein each of the plurality of logical states includes a set of programming options for modifying texture parameters of a corresponding one of the texture maps, and wherein the plurality of logical states are linked such that an output of logical states associated with a first texture map provides an input to logical states associated with a second texture map;
   detecting selection of a programming option of the set of programming options for at least one logical state associated with each texture map to produce selected programming options;
   providing generic programming instructions including source code corresponding to the selected programming options; and
   presenting the generic programming instructions to a user as the programming options are selected.

2. The method of claim 1, further comprising the step of providing a visual representation of the generation of the generic programming instructions corresponding to the selected programming options.

3. The method of claim 1, wherein a number of the plurality of logical states associated with each texture map is constant.

4. The method of claim 1, further comprising the step of grouping the generic programming instructions for the selected programming options into a transportable set of generic programming instructions.

5. The method of claim 1, wherein at least some of the plurality of logical states are arranged in pairs, the method further comprising the step of providing a plurality of switches associated with each texture map, wherein the plurality of switches allow the user to choose programming options from one of each pair of logical states.

6. The method of claim 1, wherein the plurality of logical states collectively simulates multiple modes of processing graphic images.

7. The method of claim 1, wherein at least one of the selected programming options comprises a null operation.

8. A generic programming instruction generator comprising:
   a plurality of texture maps;
   a plurality of logical states associated with each texture map, wherein each of the plurality of logical states includes a set of programming options for modifying texture parameters of a corresponding one of the texture maps, and wherein the plurality of logical states are linked such that an output of logical states associated with a first texture map provides an input to logical states associated with a second texture map;
   a circuit for detecting selection of a programming option of the set of programming options for at least one logical state associated with each texture map to produce selected programming options;
   a circuit for providing generic programming instructions including source code corresponding to the selected programming options; and
   a window for presenting the generic programming instructions to a user as the programming options are selected.

9. The generic programming instruction generator of claim 8, further comprising a window for providing a visual representation of the generation of the generic programing instructions corresponding to the selected programming options to the user.

10. The generic programming instruction generator of claim 8, wherein a number of the plurality of logical states associated with each texture map is constant.

11. The generic programming instruction generator of claim 8, further comprising for grouping the generic programming instructions for the selected programming options into a transportable set of generic programming instructions.

12. The generic programming instruction generator of claim 8, wherein at least some of the plurality of logical states are arranged in pairs, the generic programming instruction generator further comprising a plurality of switches associated with each texture map, wherein the plurality of switches allow the user to choose programming options from one of each pair of logical sates.

13. The generic programming instruction generator of claim 8, wherein the plurality of logical states collectively simulates multiple modes of processing graphic images.

14. A digital storage medium that stores programming instructions that cause a processing module to generate generic programming instructions for video graphics applications, the digital storage medium comprising:

first storage means for storing a plurality of texture maps;

second storage means for storing operational instructions that cause the processing module to provide a plurality of logical states associated with each texture map, wherein each of the plurality of logical states includes a set of programming options for modifying texture parameters of a corresponding one of the texture maps, and wherein the plurality of logical states are linked such that an output of logical states associated with a first texture map provides an input to logical states associated with a second texture map;

third storage means for storing operational instructions that cause the processing module to detect selection of a programming option of the set of programming options for at least one logical state associated with each texture map to produce selected programming options; and fourth storage means for storing operational instructions that cause the processing module to provide generic programming instructions including source code corresponding to the selected programming options; and fifth storage means for storing operational instructions that cause the processing module to present the generic programming instructions to a user as the programming options are selected.

15. The digital storage medium of claim 14, further comprising means for storing operational instructions that cause the processing module to provide a visual representation of the generation of the generic programming instructions corresponding to the selected programming options.

16. The digital storage medium of claim 14, wherein a number of the plurality of logical states associated with each texture map is constant.

17. The digital storage medium of claim 14, further comprising means for storing operational instructions that cause the processing module to group the generic programming instructions for the selected programming options into a transportable set of generic programming instructions.

18. The digital storage medium of claim 14, wherein at least some of the plurality of logical states are arranged in pairs, the digital storage medium further comprising means for storing operational instructions that cause the processing module to provide a plurality of switches associated with each texture map, wherein the plurality of switches allow the user to choose programming options from one of each pair of logical states.

19. The digital storage medium of claim 14, wherein the plurality of logical states collectively simulates multiple modes of processing graphic images.

* * * * *